United States Patent
Yang et al.

(10) Patent No.: US 11,050,274 B2
(45) Date of Patent: Jun. 29, 2021

(54) ELECTRONIC CHARGER AND MOUNT FOR PERSONAL TRAVEL CASE

(71) Applicant: Roger Yang, Pomona, CA (US)

(72) Inventors: Roger Yang, Irvine, CA (US); Chenhua Chen, Chino Hills, CA (US)

(73) Assignee: Traveler's Choice Travelware, Pomona, CA (US)

( * ) Notice: Subject to any disclaimer, the term of this patent is extended or adjusted under 35 U.S.C. 154(b) by 187 days.

(21) Appl. No.: 16/453,131

(22) Filed: Jun. 26, 2019

(65) Prior Publication Data

US 2020/0412141 A1     Dec. 31, 2020

(51) Int. Cl.
*H01M 10/46* (2006.01)
*H02J 7/00* (2006.01)
*H02J 7/34* (2006.01)
*H01M 50/256* (2021.01)

(52) U.S. Cl.
CPC ......... *H02J 7/0044* (2013.01); *H01M 50/256* (2021.01); *H02J 7/0027* (2013.01); *H02J 7/342* (2020.01)

(58) Field of Classification Search
CPC .......... H02J 7/0044; H02J 7/342; H02J 50/10; H02J 50/005; H02J 50/90; H01M 2220/30; H01M 50/256
USPC ......... 320/107, 108, 112, 114, 115
See application file for complete search history.

(56) References Cited

U.S. PATENT DOCUMENTS

| | | | |
|---|---|---|---|
| 2009/0082835 A1* | 3/2009 | Jaax | H02J 7/007192 607/61 |
| 2013/0214931 A1* | 8/2013 | Chia | A45C 13/02 340/815.4 |
| 2016/0344224 A1* | 11/2016 | Hong | H02J 7/027 |
| 2017/0271892 A1* | 9/2017 | Cross | H02J 7/0021 |
| 2017/0338676 A1* | 11/2017 | Yan | H02J 7/14 |
| 2019/0109349 A1* | 4/2019 | Thiel | H01L 31/048 |
| 2019/0372406 A1* | 12/2019 | Partovi | H02J 7/00034 |
| 2020/0112194 A1* | 4/2020 | Cakmak | H02J 50/90 |

* cited by examiner

*Primary Examiner* — Edward Tso

(57) ABSTRACT

A charger for an electronic device includes a rechargeable battery, at least one charging port in the device electrically coupled with the battery, a wireless charger electrically coupled with the battery and a magnetic mount magnetically engageable with a ferromagnetic element in the electronic device. The magnetic mount is adjacent the wireless charger. The charger is mountable to a personal travel case. The electronic device may be magnetically coupled to the charger. Alternatively, the charger may be electrically connected to the electronic device with the electronic device remotely attached to the personal travel case through a magnetic bracket fixed to the personal travel case.

3 Claims, 4 Drawing Sheets

ELECTRONIC CHARGER AND MOUNT FOR PERSONAL TRAVEL CASE

BACKGROUND OF THE INVENTION

The field of the present invention is auxiliary battery powered charging for portable electronic devices.

On trips and extended excursions, battery capacity on small personal electronics such as cellphones and portable computers can become logistically limiting. Rechargeable batteries separate from the electronics are available but detract from the convenience of the electronics. When burdened with personal effects, luggage and the like, inconvenience can increase. Indeed, even holding the personal electronics in use under such circumstances can add inconvenience.

SUMMARY OF THE INVENTION

In a first aspect of the present invention, an auxiliary charging system for small electronics is incorporated into a personal travel case and includes a rechargeable battery, at least one charging port and a magnetic mount. The magnetic mount is located at a mounting surface of the charger. The electronic device is provided with a ferromagnetic element magnetically engageable with the magnetic mount. The system may also include a wireless charger located adjacent the magnetic mount at the mounting surface.

In a second aspect of the present invention, a charger system for small electronics includes a rechargeable battery, a charging port in the housing electrically coupled with the battery, a personal travel case to which the charger system is mountable, a mounting bracket of an electronic device and a power electrically engageable with the charging port and the electronic device. The mounting bracket has an attachment plate engageable with the personal travel case and a magnet movably coupled to the mounting plate and magnetically engageable with the electronic device.

Accordingly, it is a primary object of the present invention to provide more convenient operation of personal electronics when traveling. Other and further objects and advantages will appear hereafter.

DETAILED DESCRIPTION OF THE PREFERRED EMBODIMENT

Figure 1:
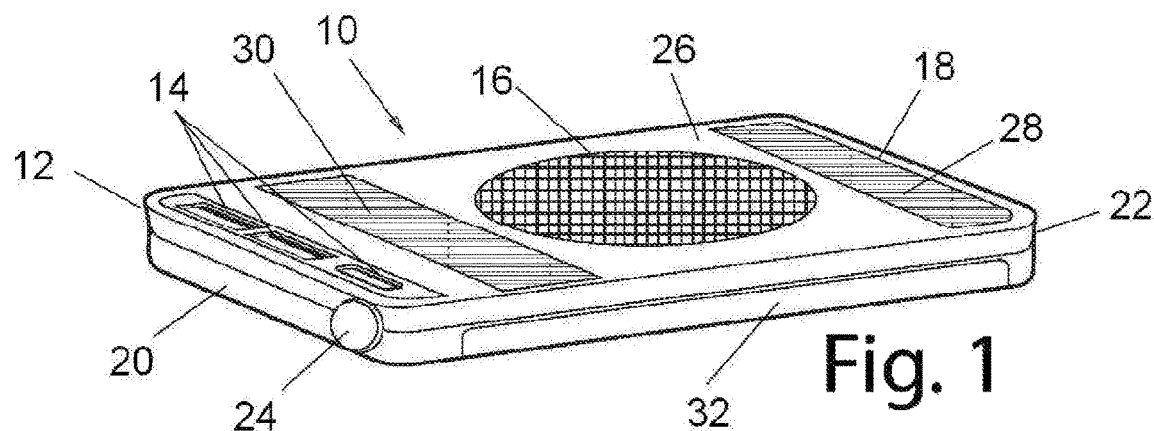
FIG. 1 is an isometric view of a charging device.
Figure 2:
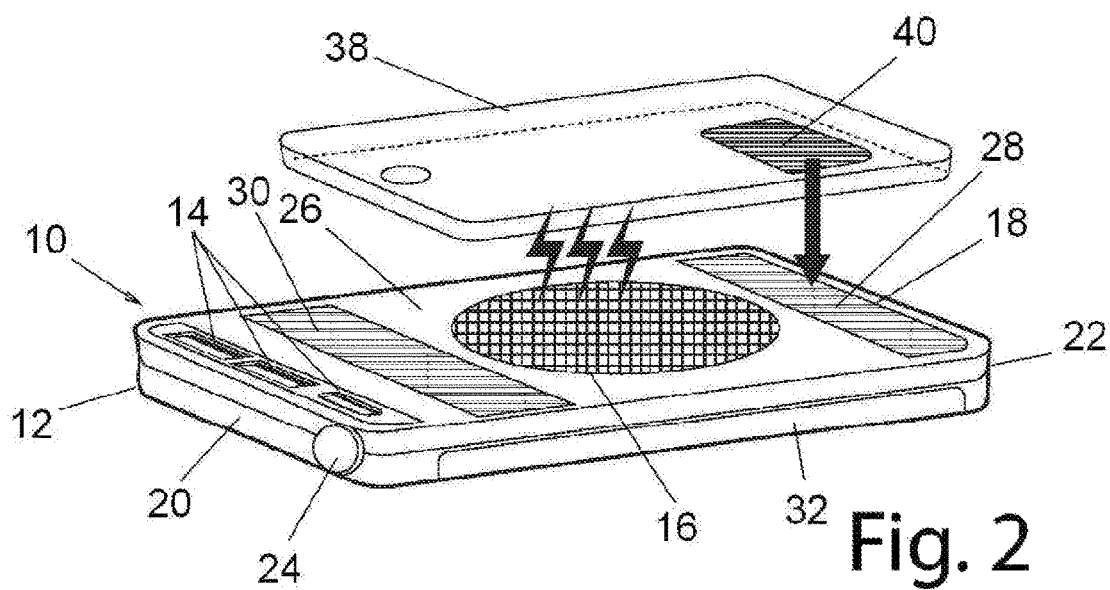
FIG. 2 is an isometric view of the charging device of FIG. 1 schematically illustrating a first association with an electronic device.
Figure 3:
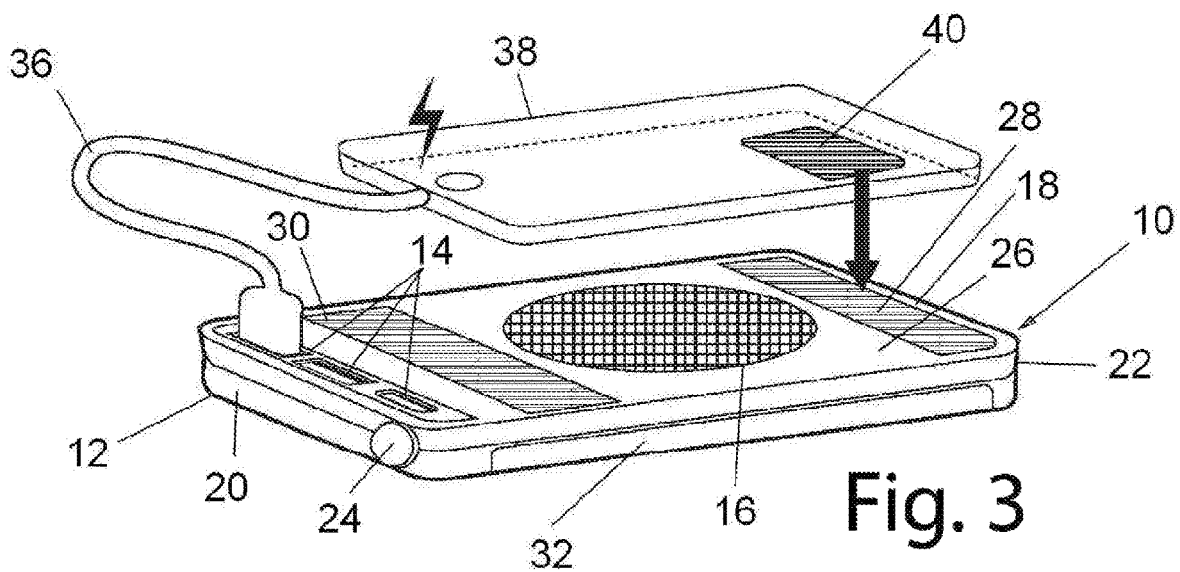
FIG. 3 is an isometric view of the charging device of FIG. 1 schematically illustrating a second association with an electronic device.

Turning in detail to the drawings, a charging device 10 for portable electronics is disclosed as including a housing 12, charging ports 14, a wireless charger 16 and a magnetic mount 18. The housing 12 in the preferred embodiment includes a base 20 and an interface attachment 22, the interface attachment 22 being pivotally mounted to the base 20 by a hinge 24. The operation of the interface attachment 22 relative to the base 20 about the hinge 24 may be seen in FIG. 4. The charging ports 14 and the wireless charger 16 are known elements designed for compatibility with existing electronic devices and connectors. The interface attachment 22 of the housing 12 includes a mounting surface 26. The wireless charger 16 is positioned at the mounting surface 26 as well as the magnetic mount 18. In the preferred embodiment, two magnets 28, 30 are shown to comprise the magnetic mount 18. The magnets 28, 30 are found to either side of the wireless charger 16. The charging ports 14 are shown to also lie in the mounting surface 26. Such ports may be located on any surface of the housing 12 and multiple such ports 14 may be employed with respective ports 14 accommodating various standard connectors.

Figure 4:
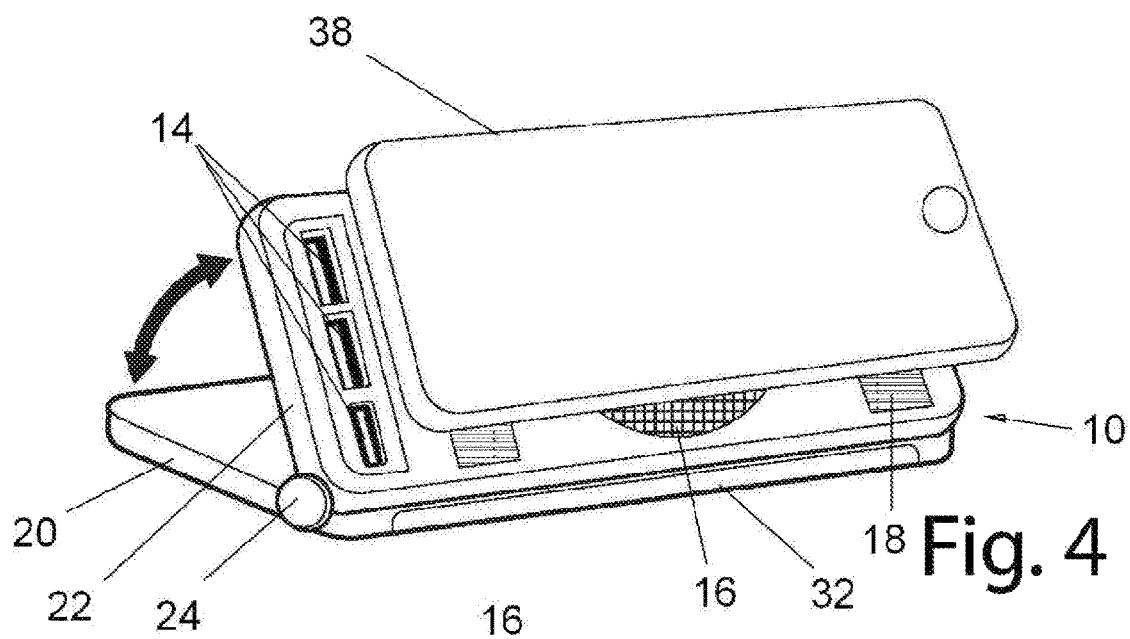
FIG. 4 is an isometric view of the charging device of FIG. 1 in a second configuration.
Figure 5:
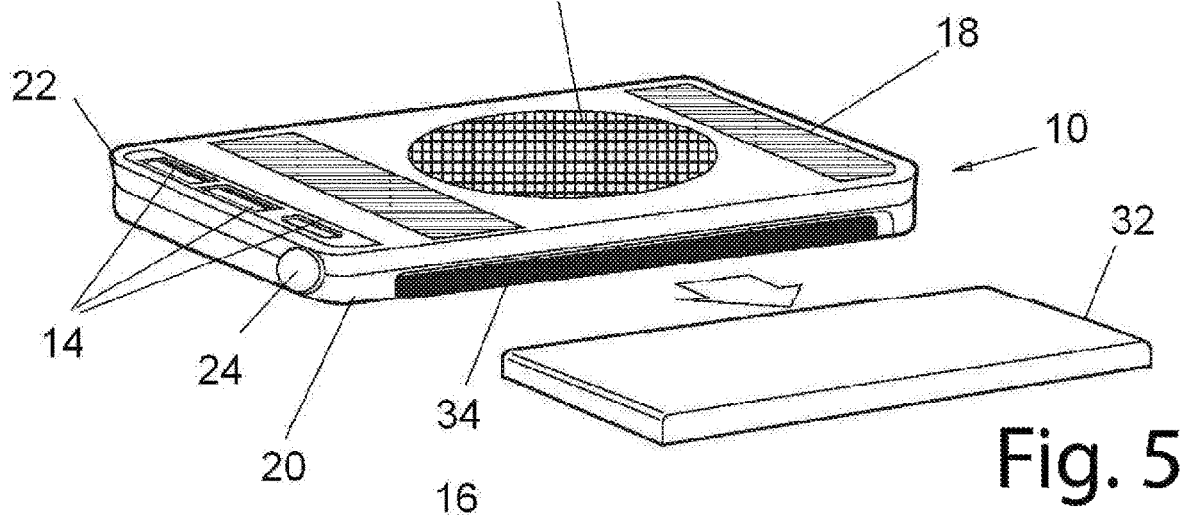
FIG. 5 is an isometric view of the charging device of FIG. 1 with the battery removed.
Figure 6:
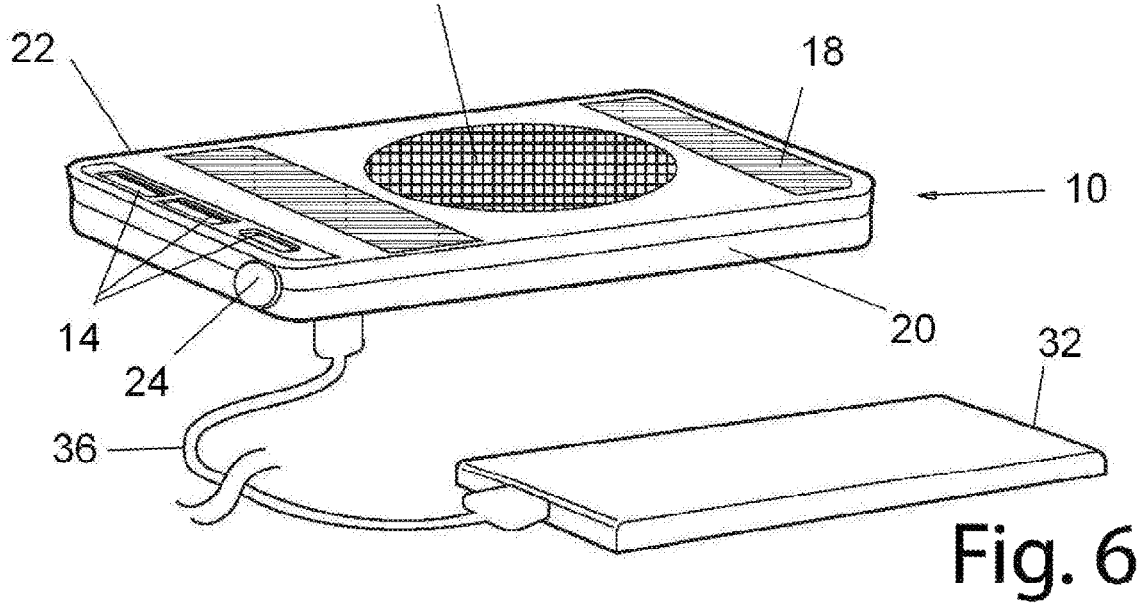
FIG. 6 is an isometric view of the charging device of FIG. 1 with a separate battery.

The base 20 of the housing 12 is graphically shown in FIGS. 4 and 5 to receive a rechargeable battery 32. The battery 32 is plate-like in shape to reduce the profile of the charging device 10. The slot 34 in the base 20 is arranged to receive the battery 32 to align the terminals of the battery 32 with conductors electrically coupled with the charging ports 14 and the wireless charger 16. At least one of the charging ports 14 may receive a battery charging connector for recharging of the battery 32. As illustrated in FIG. 6, the battery 32 may be separately disposed rather than in the housing 12. In this circumstance, a connector 36 is shown to electrically couple the battery 32 with the charging device 10 through a charging port 14 located on the base side of the housing 12.

The charging device 10 is employed with an electronic device 38. A cellphone is shown as a typical electronic device 38, however, other electronic devices 38 such as computer notebooks, laptops and the like are equally advantaged by this charging device 10. To engage the electronic device 38 with the charging device 10, a ferromagnetic element 40 is included fixed relative to the electronic device 38. The ferromagnetic element 40 may be integrally provided with the electronic device 38 or specifically added to the electronic device 38 for association with the magnetic mount 18 to retain the electronic device 38 on the charging device 10. The ferromagnetic element 40, when separately provided, may be bonded to a non-functioning surface of the electronic device 38. In the case of cellphones, the ferromagnetic element 40 may be bonded instead to the protective case found on most cellphones. Given the two magnets 28, 30 adjacent to either side of the wireless charger 16, the electronic device 38 may be optionally arranged to engage the ferromagnetic element 40 with one of the two magnets 28, 30. If more secure engagement is desired, multiple such ferromagnetic elements 40 may be employed for engagement with both magnets 28, 30.

Figure 7:
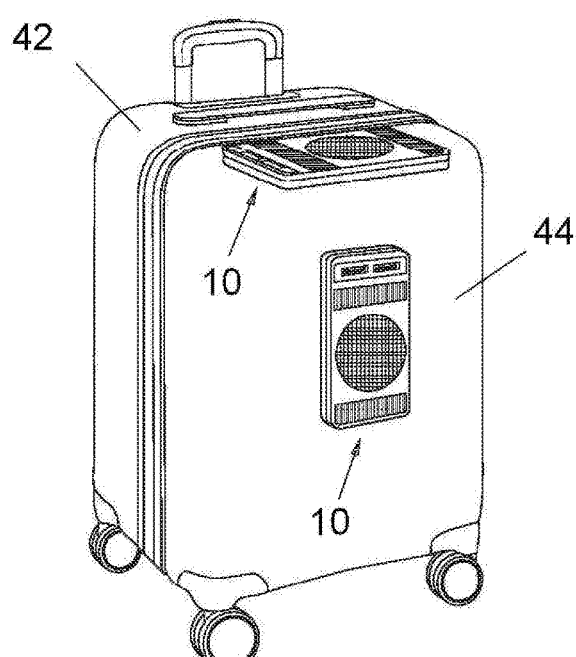
FIG. 7 is an isometric view of a personal travel case illustrating two possible locations for charging device placement.
Figure 8:
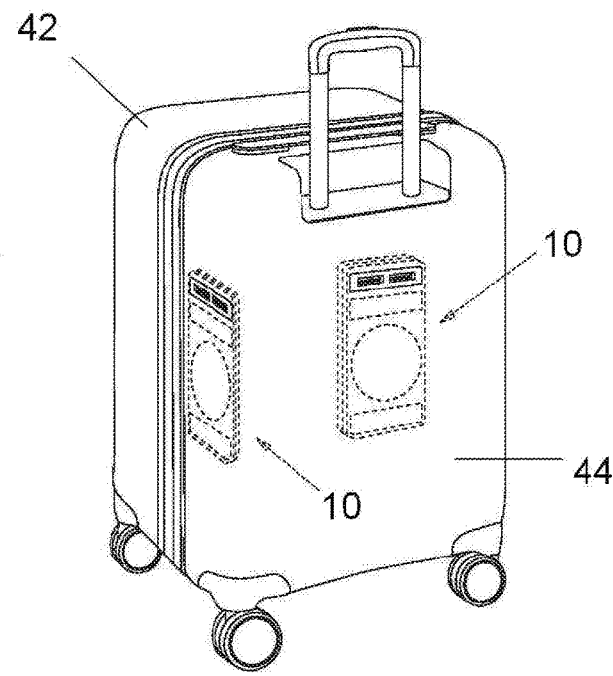
FIG. 8 is an isometric view of a personal travel case illustrating two additional possible locations for charging device placement.

The charging device 10 is advantageously employed with travel containers of almost infinite variety. FIGS. 7 through 10 illustrate a few such travel containers such as luggage, backpacks and the like. All such containers are generically referred to here as personal travel cases 42. FIG. 7 illustrates a personal travel case 42 having charging devices 10 located at two possible locations on the exterior of the personal travel case 42. FIG. 8 illustrates charging devices 10 located at possible locations on the interior of the personal travel case 42. In the circumstance of FIG. 8, the personal travel case 42 has a non-ferromagnetic wall against which the mounting surface 26 may be placed. The wall 44 being non-ferromagnetic will not inhibit magnetic engagement of the electronic device 38 with the charging device 10. With any of the locations illustrated in FIGS. 7 and 8, a user of the personal travel case 42 can recharge an electronic device 38 engaged with the magnetic mount 18 hands free. By having the charging device 10 attached to the personal travel case 42 by fasteners or brackets, the entire assembly may be captured for continuing convenience. Given the pivotal nature of the housing 12 as illustrated in FIG. 4, the electronic device 38 may be oriented conveniently for viewing even while charging.

Figure 9:
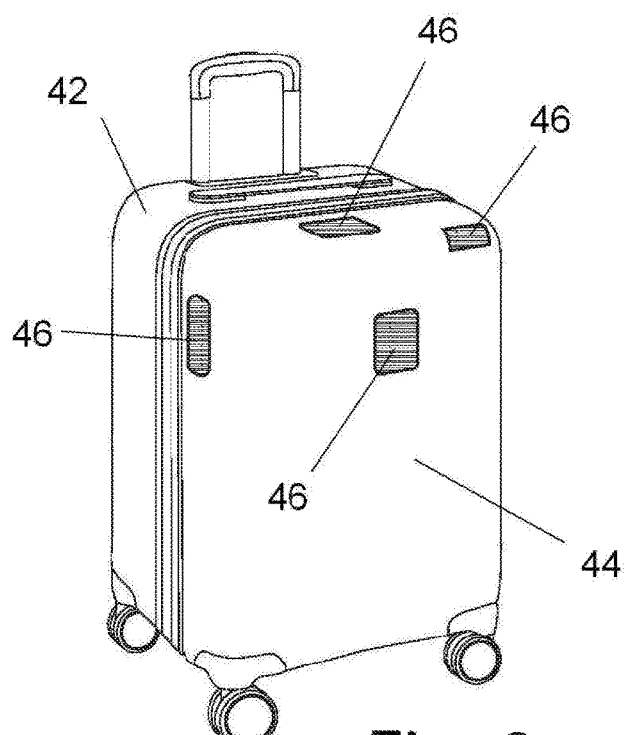
FIG. 9 is an isometric view of a personal travel case illustrating four possible locations for a mounting magnet placement.
Figure 10:
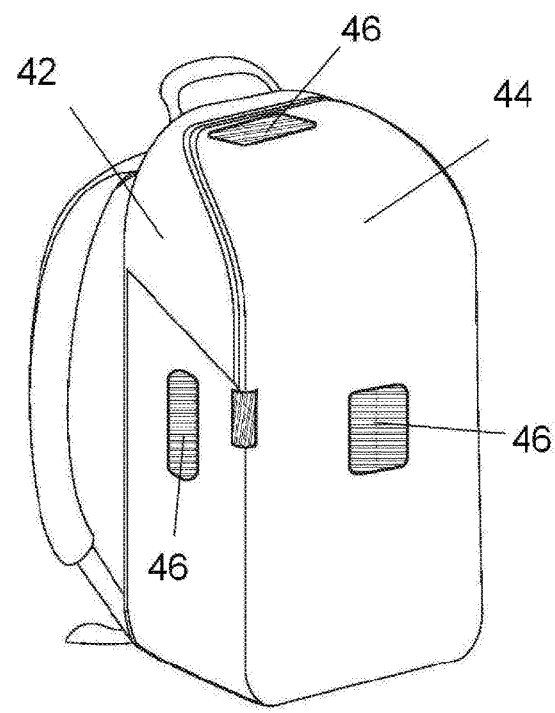
FIG. 10 is an isometric view of a personal travel case illustrating four additional possible locations for a mounting magnet placement.
Figure 11:
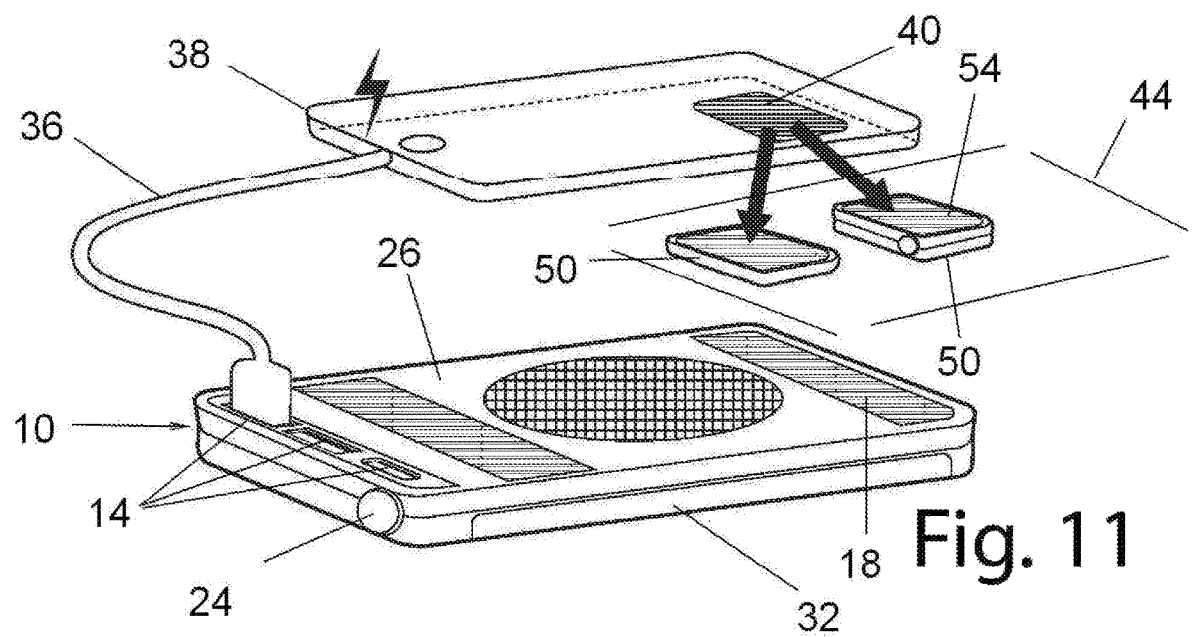
FIG. 11 is an isometric view of a charging device of FIG. 1 schematically illustrating association with a remote electronic device mounting.

Rather than locating the charging device 10 for engagement with the electronic device 38, magnets 46 may be fixed to the personal travel cases in one or more location on either the outside or the inside of the personal travel case 42 at locations illustrated in FIGS. 9 and 10. With a magnet 46 located on the personal travel case 42, the charging device 10 may be included in the personal travel case or on the outside of the personal travel case 42 displaced from the magnet 46 and coupled with the electronic device 38 through a connector 48 as best seen in FIG. 11. The magnet 46 is also illustrated in FIG. 11.

Also illustrated is a mounting bracket 50 which may be alternatively employed. The mounting bracket 50 includes an attachment plate 52 which may be engaged with the personal travel case 42. This engagement may be through bonding, fasteners or brackets. Alternatively, the charging device 10 may be located either inwardly or outwardly of the personal travel case 42 with the magnet 46 or the attachment plate 52 retained by magnetic engagement with the magnetic mount 18 outwardly facing of the personal travel case 42. If the charging device 10 is inwardly of the personal travel case 42, the non-ferromagnetic wall 44 may be presented to the attachment plate 52. In magnetic engagement with the magnetic mount 18, the attachment plate 52 operates as a second ferromagnetic element.

Figure 12:
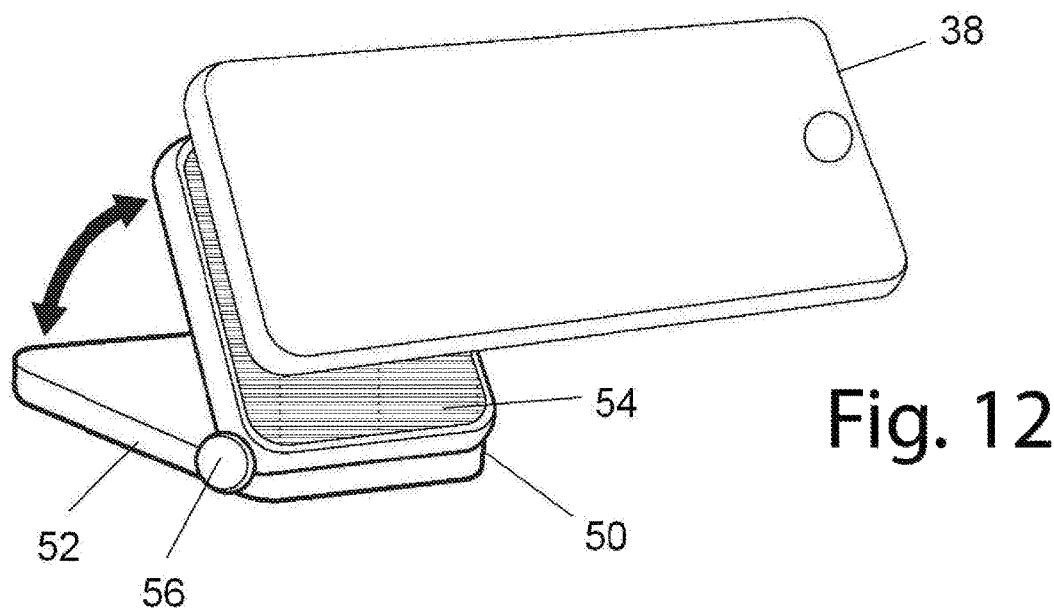
FIG. 12 is an isometric view of an electronic device on a remote mounting.
Figure 13:
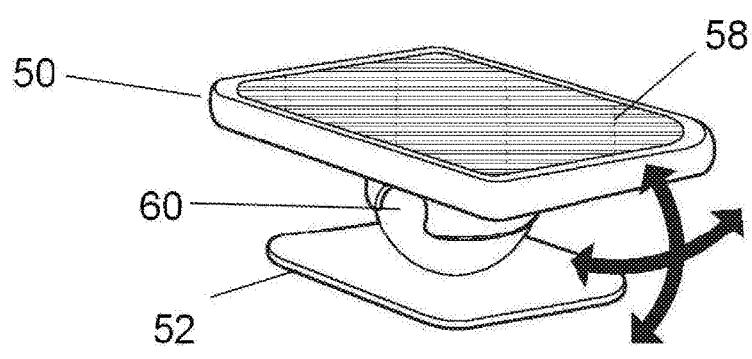
FIG. 13 is an isometric view of a multidirectional remote mount.

With the mounting bracket 50, a magnet 54 is engaged with the attachment plate 52 by a hinge 56. This arrangement allows the electronic device 38 to be pivoted for better viewing as illustrated in FIG. 12. FIG. 13 illustrates a further possibility where a magnet 58 to be engaged with the ferromagnetic element 40 of the electronic device 38 is supported by a universally pivotable mount 60.

Accordingly, a system for charging portable electronics with travel luggage has been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A charger for an electronic device having at least one ferromagnetic element, comprising
    a personal travel case;
    a charging device including a rechargeable battery and a housing engaged with the personal travel case, the housing having at least one charging port electrically coupled with the battery, a wireless charger electrically coupled with the battery and a magnetic mount magnetically engageable with the at least one ferromagnetic element, the housing having a mounting surface, the magnetic mount being at the mounting surface to magnetically engage the at least one ferromagnetic element, the wireless charger being at the mounting surface to charge the electronic device with the magnetic mount and the at least one ferromagnetic element magnetically engaged, the housing being fixable to the personal travel case with the mounting surface facing outwardly of the personal travel case.

2. The charger for an electronic device of claim 1, the personal travel case including a nonferromagnetic wall, the mounting surface being juxtaposed with the wall inside the personal travel case to receive the electronic device outside of the personal travel case.

3. The charger for an electronic device of claim 2, the nonferromagnetic wall covering the wireless charger.

\* \* \* \* \*